United States Patent
Davies

(10) Patent No.: US 10,184,675 B2
(45) Date of Patent: Jan. 22, 2019

(54) DEHUMIDIFICATION SYSTEM AND METHOD

(71) Applicant: INTEX HOLDINGS PTY LTD, Payneham, South Australia (AU)

(72) Inventor: Roger Philip Davies, Collinswood (AU)

(73) Assignee: Intex Holdings Pty Ltd, Payneham, SA (AU)

( * ) Notice: Subject to any disclaimer, the term of this patent is extended or adjusted under 35 U.S.C. 154(b) by 0 days.

(21) Appl. No.: 15/522,200

(22) PCT Filed: Oct. 27, 2015

(86) PCT No.: PCT/AU2015/000641
§ 371 (c)(1),
(2) Date: Apr. 26, 2017

(87) PCT Pub. No.: WO2016/065394
PCT Pub. Date: May 6, 2016

(65) Prior Publication Data
US 2017/0321909 A1    Nov. 9, 2017

(30) Foreign Application Priority Data
Oct. 27, 2014    (AU) ................................ 2014904292

(51) Int. Cl.
*B01D 53/02* (2006.01)
*F24F 3/14* (2006.01)
(Continued)

(52) U.S. Cl.
CPC ........ *F24F 3/1429* (2013.01); *B01D 53/0438* (2013.01); *B01D 53/0446* (2013.01);
(Continued)

(58) Field of Classification Search
CPC .......... B01D 2253/108; B01D 2257/80; B01D 2259/40088; B01D 53/0438; B01D 53/0446; B01D 53/261; F24F 3/1429
See application file for complete search history.

(56) References Cited

U.S. PATENT DOCUMENTS 4,719,761 A    1/1988  Cromer
5,890,372 A    4/1999  Belding et al.

FOREIGN PATENT DOCUMENTS

JP    H07-163830 A    6/1995
JP    2005283052 A    10/2005
JP    2010121920 A    6/2010

OTHER PUBLICATIONS

Translation of JPH07163830, Nikai Isao, Jun. 27, 1995.*

* cited by examiner

*Primary Examiner* — Christopher P Jones
(74) *Attorney, Agent, or Firm* — Sand & Sebolt

(57) ABSTRACT

The present invention relates to a dehumidification system and method and, in particular, to a system and method for controlling the humidity of air in a process or location using a desiccant-coated fluid-air heat exchanger. The desiccant material adsorbs water at or above ambient temperatures during an adsorption cycle, and the resultant air stream is of a reduced humidity compared with the humidity of the supply air. The desiccant material may then be dried during a regeneration cycle through addition of heating fluid through the heat exchanger, driving water back into the vapor state with addition of latent energy of vaporization. The desiccant material may be cooled, during the adsorption cycle, through addition of cooling fluid through the heat exchanger to maintain the temperature within a range sufficient for water vapor to be removed from the stream of air.

16 Claims, 5 Drawing Sheets

(51) Int. Cl.
 *B01D 53/04* (2006.01)
 *B01D 53/26* (2006.01)
 *F24F 5/00* (2006.01)
(52) U.S. Cl.
 CPC .......... *B01D 53/261* (2013.01); *F24F 3/1411* (2013.01); *F24F 5/0035* (2013.01); *B01D 2253/108* (2013.01); *B01D 2257/80* (2013.01); *B01D 2259/40088* (2013.01); *F24F 2003/1458* (2013.01)

DEHUMIDIFICATION SYSTEM AND METHOD

FIELD OF THE INVENTION

The present invention relates to a dehumidification system and method and, in particular, to a system and method for controlling the humidity of air in a process or location using a desiccant-coated fluid-air heat exchanger.

BACKGROUND OF THE INVENTION

It is well known that air conditioning systems must be designed to alter both the temperature and the humidity of supply air to achieve specified thermal conditions in a conditioned space. Typically, moisture vapour production within a conditioned space is modest, and so most of the latent thermal energy load on an conditioning system is incurred when reducing the humidity of supply (or fresh) air, to a specified range, rather than removing water vapour from recirculated air flow within the space.

In a building, for example, in addition to sensible heat that must be added or removed to maintain a specified internal building temperature, excess water vapour may also have to be removed from air entering the building to maintain a specified internal humidity range. Such sensible heat and humidity control typically forms part of an air-conditioning and ventilation system.

The typical specified range for ventilated air entering occupied buildings, which may include residential and commercial buildings and the like, lies in the range of 22° C. to 23° C., and relative humidity typically is in the range of 50% to 65%. This relative humidity corresponds to a range between 9.73 g and 13.4 g water per kilogram air (absolute humidity).

When outside conditions are hot and moist (for example, 33° C. and 90% relative humidity), humidity ratio is around 35.4 g of water per kilogram of air. If this air is transferred to a location and cooled to a lower specified temperature range by removal of sensible heat, the relative humidity may reach 100% as the air cools and condensation then occurs with further cooling. In this example, up to 20 g of water per kilogram of air must be removed in order to produce a specified relative humidity of 55% at 23° C., as the external air is cooled to the specified internal temperature.

There are various known techniques for dehumidifying air within a process or location. One method is by thermal condensation which involves drawing air across a cold surface. As the air cools and relative humidity reaches 100%, water vapour in the air condenses as liquid water droplets. For example, a fan may draw moist air over a condensing coil maintained at or less than 11° C. The condensing coil causes condensation of some of the water vapour in the air, leaving air at a maximum humidity ratio of 9.9 g/kg air. The air is then re-heated to a temperature suitable for supply to the conditioned space, for example to around 18° C.

However, this method requires large amounts of mechanical energy, usually converted from electrical energy. This mechanical energy is used to operate a reverse Rankine cycle heat pump that must provide refrigerant fluid cooled to temperatures at or below 11° C. in the condensing coil to achieve an absolute humidity of less than 9.9 g water per kilogram of air (corresponding to a specified relative humidity of around 50% at 22 C in the conditioned space). This method of cooling supply air results in a substantial sensible cooling load as the supply air is cooled to around 11° C., as well as the latent energy load required to condense water vapour from the supply air at this temperature. This latent energy component varies with ambient humidity. For example, removal of 20 g of water vapour requires removal of around 45,000 J of latent energy. This is a typical peak demand for 1000 m² of office space, representing a continuous latent cooling load of up to 45 kW per thousand square meters of ventilated space. The supply air temperature is reduced to less than 12° C. and then re-heated to the specified final supply air temperature. Further sensible heat energy is required to cool and then reheat the air.

Reverse Rankine cycle heat pump air conditioning equipment of this type must be capable of handling the latent load imposed by high humidity supply air passing over a condensing coil, which is chilled to around less than 11° C. to produce the required final absolute humidity in the supply air. When operating in conditions of high ambient temperature and high humidity, both the sensible and latent cooling loads are large and these loads must be met by typically a reverse cycle heat pump. These pumps work less efficiently as the temperature differential increases in hot humid periods, requiring increased input of electrical or mechanical energy, usually sourced from a fossil or nuclear fuel powered generator. The plant must be sized to operate at the peak cooling load required by the supply air system but typically operates at a lower power resulting in further inefficiency of conversion of input energy during operation at these times. In urban areas building air conditioning can form up to 35% of the total load on the electrical grid, at peak times in summer months. This load contributes significantly to the required grid capacity and therefore the cost of the electrical grid, which may result in oversizing of electrical generating plants to meet this peak summer cooling load, and consumes large amounts of fossil fuels, producing very significant amounts of green house gases.

Another known dehumidification method uses ionic membranes. Apparatus employing ionic membrane technology operate at a molecular level. Water vapour is removed through electrolysis. This dehumidification occurs at rates too low for practical use in air conditioning systems.

Yet another method involves the use of adsorption/desiccant technology. Dehumidification apparatus utilizing this technology works by exposing the high relative humidity supply air to a desiccant, which adsorbs moisture when water molecules bind to the desiccant surface. When saturated, or nearly saturated, the desiccant is removed from the moist supply air path and the adsorbed moisture is removed from the desiccant, through the application of heat.

The only commercially available adsorption systems known to the Applicant that directly remove water from the air, utilise a large wheel containing an extensive honeycomb mesh coated with desiccant material that is rotated through two separated air streams. The first air stream is a stream of hot air to dry the desiccant material, and the second air stream is the supply air stream to remove water vapour from supply air. Water vapour is removed directly from the air stream by adsorption and then as the wheel rotates, the saturated desiccant is returned to the regenerating stream of hot air that vaporizes adsorbed water from the honeycomb mesh during the regeneration cycle. The desiccator wheel thus rotates through alternating adsorption and regeneration sections. The high temperature air required for regeneration of the desiccant is either provided by direct heating from a dedicated source (typically provided by burning fossil fuel), or by indirectly produced thermal energy supplied to large heat exchangers positioned in the air stream (the large size is dictated by the low specific heat capacity of air). The rotating wheel is expensive and prone to damage over time due to its large size, and delicate honeycomb structure. Seals are required to prevent admixing of the two streams of air, and these seals are also prone to mechanical failure over time. The regeneration cycle is performed at high temperatures, close to the boiling point of water requiring substantial thermal energy input, typically from a fossil fuel source such as a gas burner. The energy supplied must exceed the latent load of the supply air stream, to regenerate the desiccant material. The desiccant material on the honeycomb is at a high temperature at the conclusion of the regeneration cycle and on rotation into the supply air stream, adds temperature to the supply air resulting in an increased sensible cooling load which must be met elsewhere in the supply air conditioning process.

It is an object of the present invention to overcome at least some of the aforementioned problems or to provide the public with a useful alternative.

Any discussion of documents, acts, materials, devices, articles or the like, which has been included in the present specification is solely for the purpose of providing a context for the present invention. It should not be taken as an admission that any or all of the previous discussion forms part of the prior art base or was common general knowledge in the field of the invention as it existed before the priority date of any of the claims herein.

SUMMARY OF THE INVENTION

According to an aspect, the present invention provides a dehumidification system for providing dehumidified air to a process or location, the dehumidification system including:

a fluid-air heat exchanger including an external, air-side surface coated with desiccant material, wherein during an adsorption cycle fluid is passed through the heat exchanger at a temperature which causes water vapour to be removed from a stream of air permitted or forced across the heat exchanger;

a means for permitting or forcing a stream of air across said heat exchanger during the adsorption cycle; and a means of heating the desiccant material during a regeneration cycle to cause adsorbed water to be removed from the desiccant material by vaporisation, thereby regenerating the desiccant material to a state which will allow the desiccant material to remove water vapour from a stream of air in a subsequent adsorption cycle.

In an embodiment, the system further includes:

a means of cooling the desiccant material during the adsorption cycle in order to maintain said temperature within a range sufficient for water vapour to be removed from the stream of air.

In an embodiment, the means of cooling the desiccant material is the fluid-air heat exchanger wherein cooling is achieved by passing a cooling fluid through the fluid-air heat exchanger.

In an embodiment, the means of heating the desiccant material is the fluid-air heat exchanger wherein heating is achieved by passing heating fluid through the fluid-air heat exchanger.

In an embodiment, the method further includes a 2-way valve at an entry into said heat exchanger which is operable to switch between heating and cooling fluid supply to the heat exchanger.

In an alternate embodiment, the heating and cooling fluid is fluid from a common source heated or cooled prior to entry into the heat exchanger according to whether the heat exchanger is operating an adsorption or regeneration cycle.

In an embodiment, the means of permitting or forcing a stream of air is one or more fans.

In an embodiment, the fluid-air heat exchanger is in the form of a fin radiator including a fluid flow pipe and associated heating/cooling fins which are coated in said desiccant material.

In an embodiment, the fluid-air heat exchanger and the means for permitting or forcing a stream of air is disposed in ductwork used to transport ambient air into a location.

In an alternate embodiment, the fluid-air heat exchanger and the means for permitting or forcing a stream of air forms part of a module which is attachable to ductwork used to transport ambient air into a location.

In an embodiment, the location is a building interior.

In an embodiment, the means of permitting or forcing a stream of air across the heat exchanger is operated alternately in an air supply mode to permit or force a stream of air to the location via the fluid-air heat exchanger, and an air return mode to draw a stream of air out from the location.

In an embodiment, the return air is supplied to a process.

In an embodiment, the system further includes:

a second fluid-air heat exchanger operating in parallel to said fluid-air heat exchanger, wherein when the fluid-air heat exchanger is operating said adsorption cycle, the second fluid-air heat exchanger is operating said regeneration cycle, and vice versa, to ensure a continuous supply of dehumidified air to said location;

a means of switching the operation of each heat exchanger between adsorption and regeneration cycles; and air handling means which provide that air passing through the heat exchanger operating in said regeneration cycle is not provided to the location and air passing through the heat exchanger operating in said adsorption cycle is provided to the location.

In an embodiment, the system is configured to provide dehumidified air to a process.

In an embodiment, the process is an evaporative cooling process.

In an embodiment, the evaporative cooling process includes permitting or forcing a volume of desiccated air across a surface area of a volume of fluid, whereby the volume of air causes the temperature of said fluid to be lowered by evaporative means.

In an embodiment, the volume of fluid is held in a tank and the volume of air is permitted or forced across the top surface area of the body of fluid in the tank.

In an embodiment, the volume of fluid is in the form of droplets in a cooling tower and the volume of air is permitted or forces across a surface area of each droplet.

In an embodiment, the volume of fluid having had its temperature reduced by the evaporative cooling process is supplied to the fluid-air heat exchanger as cooling fluid used to cool the desiccant material during the adsorption cycle.

In an embodiment, the evaporative cooling process is used to cool and/or re-humidify desiccated air prior to entry into a location or further process.

In an embodiment, the system further includes:

a second fluid-air heat exchanger operating downstream of the process, wherein when the fluid-air heat exchanger is operating said adsorption cycle, the second fluid-air heat exchanger is operating said regeneration cycle, and vice versa;

a means of switching the operation of each heat exchanger between adsorption and regeneration cycles;

a means of switching a mode of operation of the means of permitting or forcing a stream of air across the heat exchanger to ensure continuous supply of dehumidified air to the process such that when the fluid-air heat exchanger is operating an adsorption cycle a stream of air is drawn across the fluid-air heat exchanger to provide dehumidified air to the process whilst the second fluid-air heat exchanger is operating a regeneration cycle, and when the second fluid-air heat exchanger is operating said adsorption cycle a stream of air is drawn across the second fluid-air heat exchanger to provide dehumidified air to the process whilst the fluid-air heat exchanger is operating a regeneration cycle.

In an alternate embodiment, the system further includes:

a second fluid-air heat exchanger operating in parallel to said fluid-air heat exchanger, wherein when the fluid-air heat exchanger is operating said adsorption cycle, the second fluid-air heat exchanger is operating said regeneration cycle, and vice versa, to ensure a continuous supply of dehumidified air to said process;

a means of switching the operation of each heat exchanger between adsorption and regeneration cycles; and air handling means which provide that air passing through the heat exchanger operating in said regeneration cycle is not provided to the process and air passing through the heat exchanger operating in said adsorption cycle is provided to the process.

In another aspect, the present invention provides a method of dehumidifying air provided to a process or location, said method including:

operating, during an adsorption cycle, a means for permitting or forcing a stream of air across a fluid-air heat exchanger including an external air-side surface coated with desiccant material, wherein fluid is passed through the heat exchanger at a temperature which causes water vapour to be removed from the stream of air by the desiccant material by adsorption;

heating, during a regeneration cycle, the desiccant material to cause adsorbed water to be removed from the desiccant material by vaporisation, thereby regenerating the desiccant material to a state which will allow the desiccant material to remove water vapour from a stream of air in a subsequent adsorption cycle.

In an embodiment, the method further includes:

cooling the desiccant material during the adsorption cycle in order to maintain said temperature within a range sufficient for water vapour to be removed from the stream of air.

In an embodiment, cooling the desiccant material includes passing cooling fluid through the fluid-air heat exchanger.

In an embodiment, heating the desiccant material includes passing heating fluid through the fluid-air heat exchanger.

In an embodiment, the method further includes:

operating a second fluid-air heat exchanger in parallel to said fluid-air heat exchanger such that when the fluid-air heat exchanger is operating said adsorption cycle, the second fluid-air heat exchanger is operating said regeneration cycle, and vice versa, to ensure a continuous supply of dehumidified air to said location or process; and handling the air such that air passing through the heat exchanger operating in said regeneration cycle is not provided to the location or process and air passing through the heat exchanger operating in said adsorption cycle is provided to the location or process.

In an alternate embodiment, the method is for providing dehumidified air to a process located downstream of the fluid-air heat exchanger, and further includes:

operating a second fluid-air heat exchanger downstream of the process such that when the fluid-air heat exchanger is operating said adsorption cycle, the second fluid-air heat exchanger is operating said regeneration cycle, and vice versa;

switching a mode of operation of the means of permitting or forcing a stream of air across the heat exchanger to ensure continuous supply of dehumidified air to the process such that when the fluid-air heat exchanger is operating an adsorption cycle a stream of air is drawn across the fluid-air heat exchanger to provide dehumidified air to the process whilst the second fluid-air heat exchanger is operating a regeneration cycle, and when the second fluid-air heat exchanger is operating said adsorption cycle a stream of air is drawn across the second fluid-air heat exchanger to provide dehumidified air to the process whilst the fluid-air heat exchanger is operating a regeneration cycle.

In an embodiment, the process is an evaporative cooling process including:

permitting or forcing a volume of desiccated air across a surface area of a volume of fluid, whereby the volume of air causes the temperature of said fluid to be lowered by evaporative means.

In an embodiment, the method further includes:

supplying the volume of fluid having its temperature reduced by the evaporative cooling process to the fluid-air heat exchanger as cooling fluid used to cool the desiccant material during the adsorption cycle.

BRIEF DESCRIPTION OF THE FIGURES

The accompanying drawings, which are incorporated in and constitute a part of this specification, illustrate several implementations of the invention and, together with the description, serve to explain the advantages and principles of the invention. In the drawings.

DETAILED DESCRIPTION OF EMBODIMENT(S) OF THE INVENTION

The following detailed description of the invention refers to the accompanying drawings. Although the description includes exemplary embodiments, other embodiments are possible, and changes may be made to the embodiments described without departing from the spirit and scope of the invention. Wherever possible, the same reference numbers will be used throughout the embodiments and the following description to refer to the same and like parts.

Figure 1:
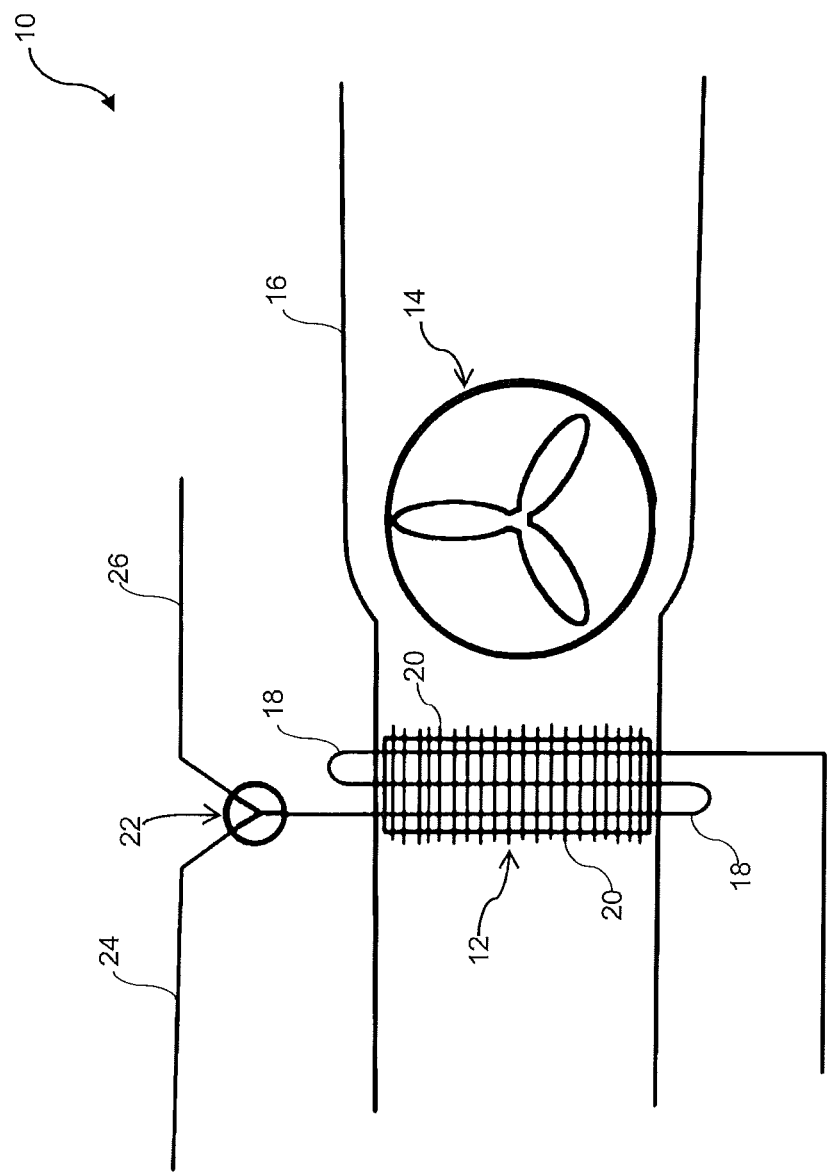
FIG. 1 is a schematic view of a dehumidification system for providing dehumidified air to a location according to an embodiment of the present invention.

A dehumidification system 10 according to an embodiment is shown schematically in FIG. 1, and includes at least one desiccant-coated heat exchanger 12 and a means of permitting or forcing air across the heat exchanger 12 and into a location. It is to be understood that whilst the embodiment shown in FIG. 1 is directed to providing dehumidified air to a location, the system 10 could equally well be configured to provide dehumidified air to a process as described below. The means of permitting or forcing air across the heat exchanger 12 is, in the example shown, in the form of a fan 14 configured to draw a stream of air into the location via a duct 16, wherein the location may for example be an interior of a building. The duct 16 may house both the heat exchanger 12 and fan 14, however, other mounting configurations and arrangements may be possible. For example, the heat exchanger 12 and fan 14 may form part of a portable dehumidification module (not shown) which is attachable to ductwork. The use of other means capable of permitting or forcing a stream of air into the location and via the heat exchanger may also be possible, for example, the fan 14 may be replaced by a damper or other handling equipment (not shown in FIG. 1) which when open permits air to pass across the heat exchanger 12.

The stream of air is therefore drawn into the building after passing through the desiccant-coated heat exchanger 12 which serves to remove water vapour from the stream of air by adsorption, thereby dehumidifying the air. Water which is adsorbed by the desiccation material is referred to herein at times as "adsorbed water", and the heat exchanger 12 is referred to herein at times as a "desiccator". The heat exchanger 12 may be of the fin radiator type, including a heat exchanger pipe 18 for accommodating fluid used to heat and/or cool associated fins 20 coated with desiccant material (not shown). In an embodiment, the fluid is water, due to its high heat capacity, abundance and ease of handling. The desiccant material could be any suitable material, such as any zeolitic adsorbent.

In order for there to be sensible cooling of the fins 20 and hence of the desiccant material to permit the removal of water vapour from the stream of air during an adsorption cycle, the fluid passing through the heat exchanger pipe 18 needs to be maintained at a lower temperature than the desiccant material. The heat exchanger 12 therefore operates in a cooling mode during the adsorption cycle. Cooling the desiccant material during the adsorption cycle removes heat energy of adsorption from the desiccant and thus permits the further adsorption of water vapour from the supply air stream.

Accordingly, those skilled in the art would already realise that the fan 14 and the heat exchanger 12 may be operated to supply fresh air to a location or a process at low relative humidity during an adsorption cycle.

The system 10 may also operate a regeneration cycle to enable the desiccant material to regenerate and then continue to draw moisture from incoming air. During a regeneration cycle, adsorbed water is removed from the desiccant material. This may be achieved by operating the heat exchanger 12 in a heating mode, whereby fluid passing through the heat exchanger pipe 18 is at a higher temperature than the desiccant material. The desiccant material may be directly heated via the fins 20. Unlike known dehumidification systems using desiccation technology, only a low temperature heat source is required to heat the fluid flowing through pipe 16 to heat the desiccant material. For example, during a regeneration cycle test, the temperature of heating fluid 24 was measured at 73° C. entering the heat exchanger pipe 18 and again measured at 59° C. on exit from the heat exchanger pipe 18. The regeneration cycle removed a total of 220 g of water from the dehumidification system 10 by desorption during heating at an average rate of 1.67 g/s over a 132 second time interval. Air entered the dehumidification system 10 at 20.2° C. with a humidity ratio of 11.75 g/kg air, and air left at a temperature of 44° C. and a humidity ratio of 16.47 g/kg air with 0.35 kg/s air passing through the system 10.

The fluid that is passed through the heat exchanger pipe 18 during the adsorption cycle is referred to herein at times as "cooling fluid", and fluid that is passed through the heat exchanger pipe 18 during the regeneration cycle is referred to herein at times as "heating fluid".

In an embodiment, the system 10 may form part of a more general building heating ventilation and cooling (HVAC) system and can be a valuable adjunct to provide dehumidified air using a low-temperature (thermal) energy source, for example obtained from a solar thermal collector (not shown).

As a result of the effectiveness of the system 10 in removing unwanted moisture from supply air (for example, in the case of building supply air, achieving an absolute humidity as low as 3 g per kg air) without significant loss of efficiency, the system 10 need only operate intermittently remove moisture from supply air to maintain a specified thermal environment at the location or process. A single desiccator or an array of desiccators working as a single unit, each operating concurrently in an adsorption or regeneration cycle, can provide the supply air requirements without the need for a continuous supply of dehydrated air. This may also simplify the control and mechanical structures required to operate the dehumidification process.

The desiccant material may be maintained at a sufficiently low temperature compared to the temperature of the desiccant material by cooling fluid supplied to the heat exchanger 12. In an embodiment, and as described further below, the heat exchanger 12 may be configured to switch between fluids used in each of the adsorption and regeneration cycles. In some circumstances, the fluid used in the regeneration cycle may be the same fluid used in the regeneration cycle. For example, heating fluid that has passed through the heat exchanger during the regeneration cycle may be appropriately cooled in another process so that it is also suitable for use as the cooling fluid during the adsorption cycle, and vice versa.

Due to the properties of adsorbant materials operating at or even above 30° C., the fluid used in the adsorption cycle is not required to be cooled to the typical condensing coil temperature range of less than 12° C. as in a hitherto known condensing coil dehumidifier. The required temperature of fluid in the heat exchanger pipe 18 can thus be achieved by sourcing cooled fluid from an evaporative means forming part of the system 30 as described further below, or even a mains water or rain water supply in circumstances where the temperature of the water is sufficiently low compared to the temperature of the desiccant material.

With the excess humidity in the supply air removed in this manner, the resulting supply air stream can be sensibly heated or cooled efficiently using the minimum required sensible thermal energy, by for example a coil heat exchanger. This system may further allow for a sensible cooling load to be handled by direct evaporative cooling to produce the temperature and relative humidity conditions specified for the location or process.

FIG. 1 further illustrates a 2-way valve 22 associated with the heat exchanger input for allowing entry of either heating 24 or cooling 26 fluid into the heat exchanger pipe 18 in accordance with an embodiment. Operation of the 2-way valve 22 causes the valve 22 to alternately supply cooling 26 and heating 24 fluid (for the adsorption and regeneration cycles respectively) to the heat exchanger pipe 18. Operation of the valve 22 may be controlled by an appropriate control mechanism (not shown). Such a control mechanism may be an electronic control mechanism, for example, and may constitute or form part of an overall system control mechanism used to also intermittently operate the fan 14 and, in the case of a reversible fan, the direction of flow of the fan, for example.

Other components which may be controlled include any downstream component that may be used to further cool or re-humidify the air stream and air handling apparatus such as dampers, for example. The system may further include means of measuring certain conditions such as the temperature and humidity of supply air, the temperature and humidity of air after the desiccator, and the temperature and humidity of air after having reached the target location or process, in order to determine the extent to which the mode of operation of these various components need to be altered. The present invention is not limited to any one particular control mechanism, system or method.

A bi-directional fan could be used in circumstances where say a location has limited ducting capacity, for example, where the exhaust air from the location must be drawn back through the same ductwork through which the treated air was supplied to the location. Because the system 10 allows for treated air to be provided to the location intermittently, that is, during the adsorption cycle but not during the regeneration cycle, the fan may be operated in reverse during the regeneration cycle in order to draw exhaust air out from the location to atmosphere.

Figure 2:
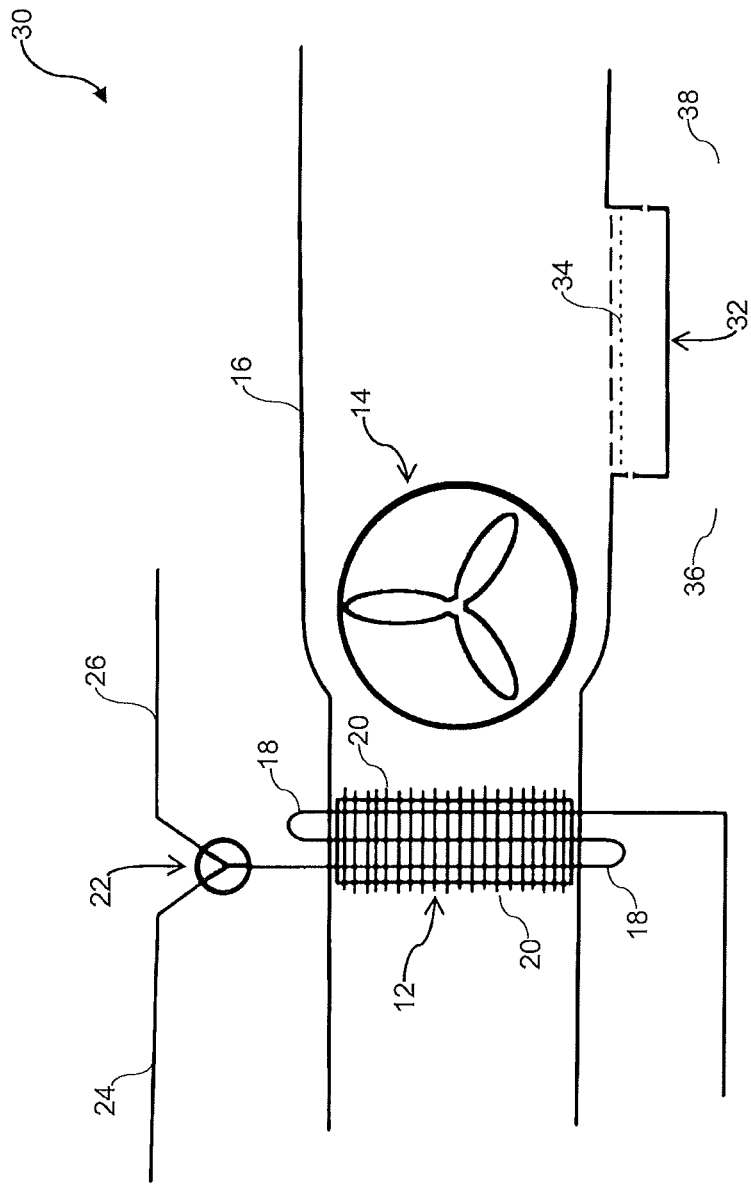
FIG. 2 is a schematic view of a dehumidification system for providing dehumidified air to an evaporative process according to an embodiment.

FIG. 2 illustrates an example system 30 in which dehumidified air is provided to a process rather than a location. In particular, the process is a downstream evaporative cooling process according to an embodiment. For the purpose of brevity, components of system 30 that perform the same or similar function to components of system 10 are referenced using like reference numerals. System 30 features an evaporative cooling process involving a volume of water 32 separated from the air stream duct 16 downstream of the fan 14 with a free surface 34 exposed to the air stream. While the system 30 is running an adsorption cycle, as earlier described with respect to system 10, the humidity downstream of the heat exchanger 12 is reduced, which lowers the wet bulb temperature of the desiccated air. The lowered humidity allows for improved evaporative cooling of the air when passed over the free surface 34. Evaporative cooling may also be utilised to add humidity back to air that may otherwise be undesirably dry.

Thus, with warm, dry air passing over the free surface 34 of a volume of a volume of water 32, the low partial pressure of water in the desiccated air permits an evaporative process from the free surface, entraining water vapour as it passes across the free surface 34. The latent heat of vaporisation of the entrained water vapour mass results in a reduced temperature of the air and of the water body. Thus the incoming air may be cooled and re-humidified by the volume of water 32 to a desirable level, while the water body is also somewhat cooled.

In this manner, the water body can be cooled to a temperature below the ambient wet bulb temperature. This can be achieved with the addition of equipment required for the circulation of the volume of water 32, being for example plumbing and a single pump. FIG. 2 shows for example the use of a warm water line 36 into the volume of water 32 and a cool water line 38 out. As the fluid may be close to atmospheric pressure, and open to atmosphere at least one location, the required additional energy input required to move the air and the cooling fluid is low, resulting in a favourable electrical coefficient of performance (ECOP) compared to mechanically operated vapour compression cycles.

The above evaporative cooling process involving the permitting or forcing of a volume of air across a free surface 34 of a volume of water 32 to produce cooled fluid is the subject of a co-pending application by the present Applicant. The co-pending application describes that the volume of fluid could equally be in the form of droplets in a cooling tower which enables an air stream to pass across the droplets to cool the fluid. It is to be understood that the present invention is not limited to any one process to which dehumidified air may be provided.

The skilled person would understand that cooled fluid produced as a by-product of a process, such as the evaporative cooling process described above, may be transferred for use in another location or process. In an embodiment, and as described below with respect to the embodiment of FIG. 4, the cooled fluid could be supplied back to the heat exchanger 12 as cooling fluid during the adsorption cycle.

Figure 3:
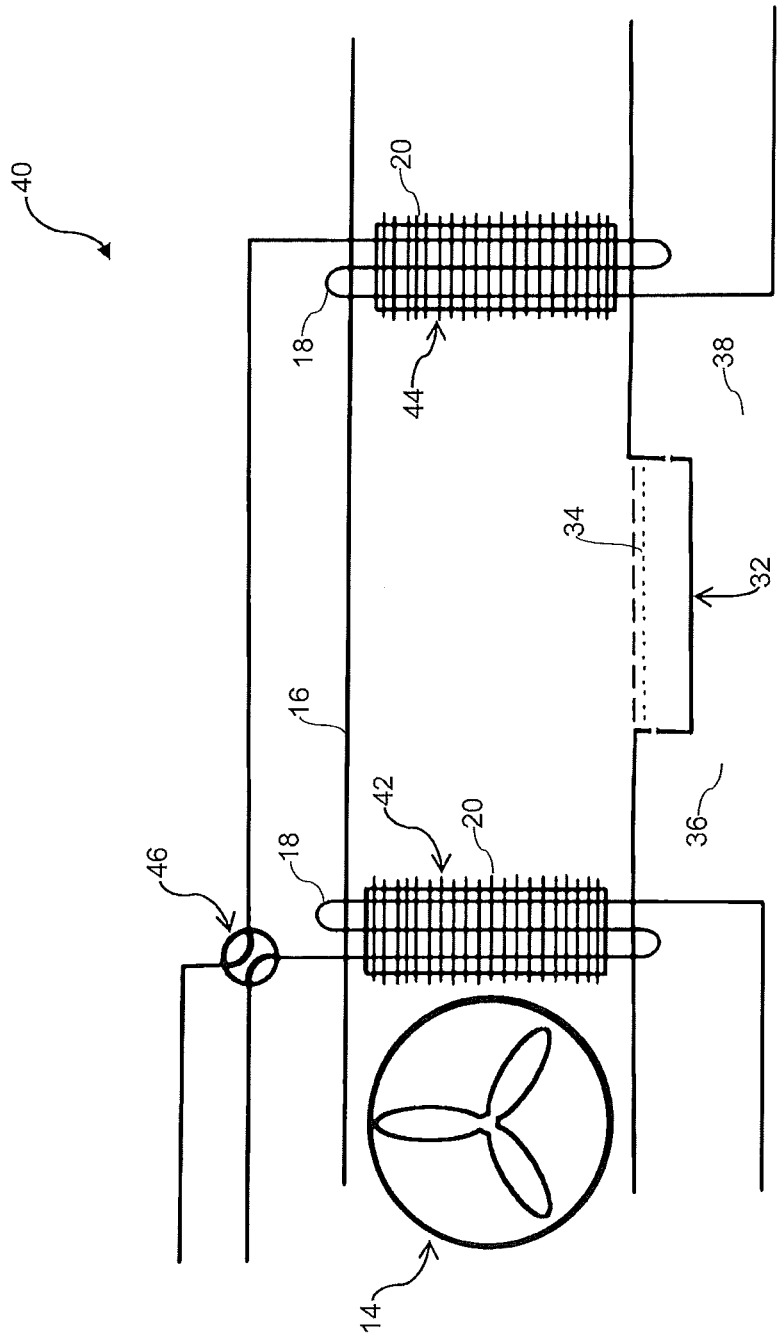
FIG. 3 is a schematic view of a dehumidification system involving two heat exchangers for providing dehumidified air to an evaporative process according to a further embodiment.

FIG. 3 illustrates a further example system 40 in which dehumidified air is provided to a process rather than a location. In the embodiment shown, the process is the earlier described evaporative cooling process, however, this is by way of example only. Identical or similarly functioning components from system 10 and 30 are referenced using like numerals. The system 40 includes two heat exchangers 42 and 44 positioned upstream and downstream of a free surface 34 of a volume of water 32. Each heat exchanger is operated in an opposite mode such that at any one time, one heat exchanger will operate an adsorption cycle and the other heat exchanger will operate a regeneration cycle, and vice versa, with the mode of operation controllably switchable.

In this embodiment warm and/or humid air may be brought in from ambient, and passed across the desiccant-coated heat exchanger 42 where it is de-humidified during an adsorption cycle, passed across the free surface 34 where it cools the water body 32 by the removal of latent heat through the entrainment of water vapour, and finally across the second desiccant-coated heat exchanger 44 which is in its regeneration cycle. In this manner, the volume of water 32 is continuously cooled, and the desiccant-coated heat exchangers 42 and 44 can be run in alternate adsorption/regeneration cycles by reversing the air path and the heating 24 or cooling 26 fluid flows.

FIG. 3 further illustrates a valve 46 associated with the heat exchanger inputs for allowing entry of either heating 24 or cooling 26 fluid into the heat exchanger pipe 18 in accordance with the heat exchanger to which the fluid is provided running either a regeneration or an adsorption cycle.

Figure 4:
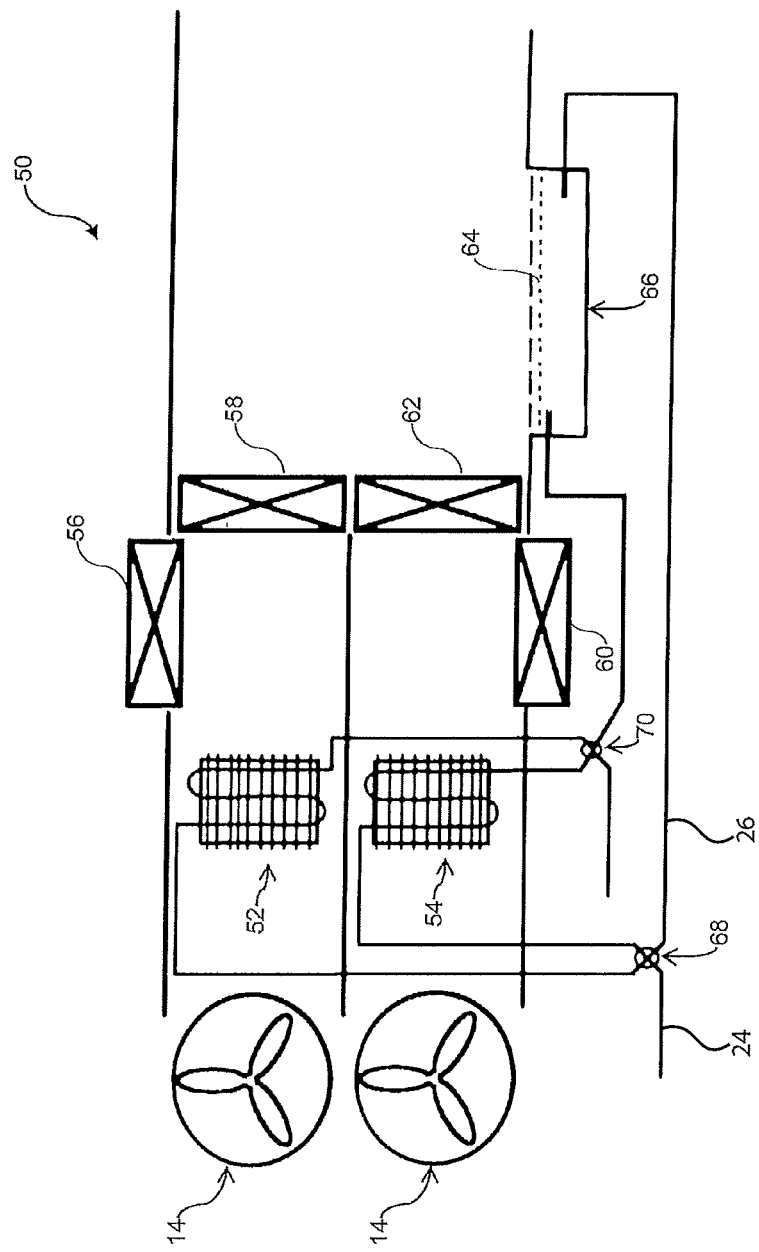
FIG. 4 is a schematic view of a dehumidification system involving two heat exchangers operating in parallel for providing dehumidified air to an evaporative process according to a further embodiment.

FIG. 4 illustrates a system 50 according to a still further embodiment in which dehumidified air is provided to a process rather than a location. In the embodiment shown, the process is the earlier described evaporative cooling process, however, this is by way of example only. Components from systems 10, 30 and 40 which are the same or have a similar purpose are referenced using like numerals. The system 50 may include a pair of desiccant-coated heat exchangers 52 and 54 operating in parallel, being alternately supplied with cooling 26 fluid and heating 24 fluid from a heat source (not shown), with a means of switching between the two sources and modes of operation as described earlier. Also shown is at least one means of permitting or forcing a stream of air independently across the heat exchangers 52 and 54. In the embodiment shown, this is in the form of two ventilation fans 14 but a single fan with appropriately controlled damping components (not shown) could equally be used.

Having passed the supplied air across the coated heat exchangers 52 and 54, the air may be controllably directed by air handlers, for example dampers 56 and 58 associated with heat exchanger 52 and dampers 60 and 62 associated with heat exchanger 54. The air that has been utilised for a regeneration cycle is allowed by a damper 56 or 60 to exit the system, while the air which has been desiccated is directed downstream via dampers 58 and 62. For example, if heat exchanger 52 is operating in a regeneration cycle and heat exchanger 54 in an adsorption cycle, damper 56 will be open and damper 58 will be closed to allow for this air to exit the system. In the meantime, damper 62 will be open and damper 60 closed to allow desiccated air to travel downstream to the process. When the mode of operation of the heat exchangers are switched, each damper is also controlled to switch from open to closed or vice versa.

As described earlier, the process may include a means of exposing a free surface 64 of a body of water 66 to be cooled by evaporation to a stream of dried air supplied by the heat exchanger operating an adsorption cycle. Water cooled from this process may be fed back into the system as cooling fluid for the heat exchangers when operating in the adsorption cycle or be used for some other process. In this regard, the system 50 may further include a valve 68 which when opened allows for feeding of cooling water into one or both of the heat exchangers, and valve 70 which when opened allows for feeding of water from one or both of the heat exchangers back into the volume of water 32.

Figure 5:
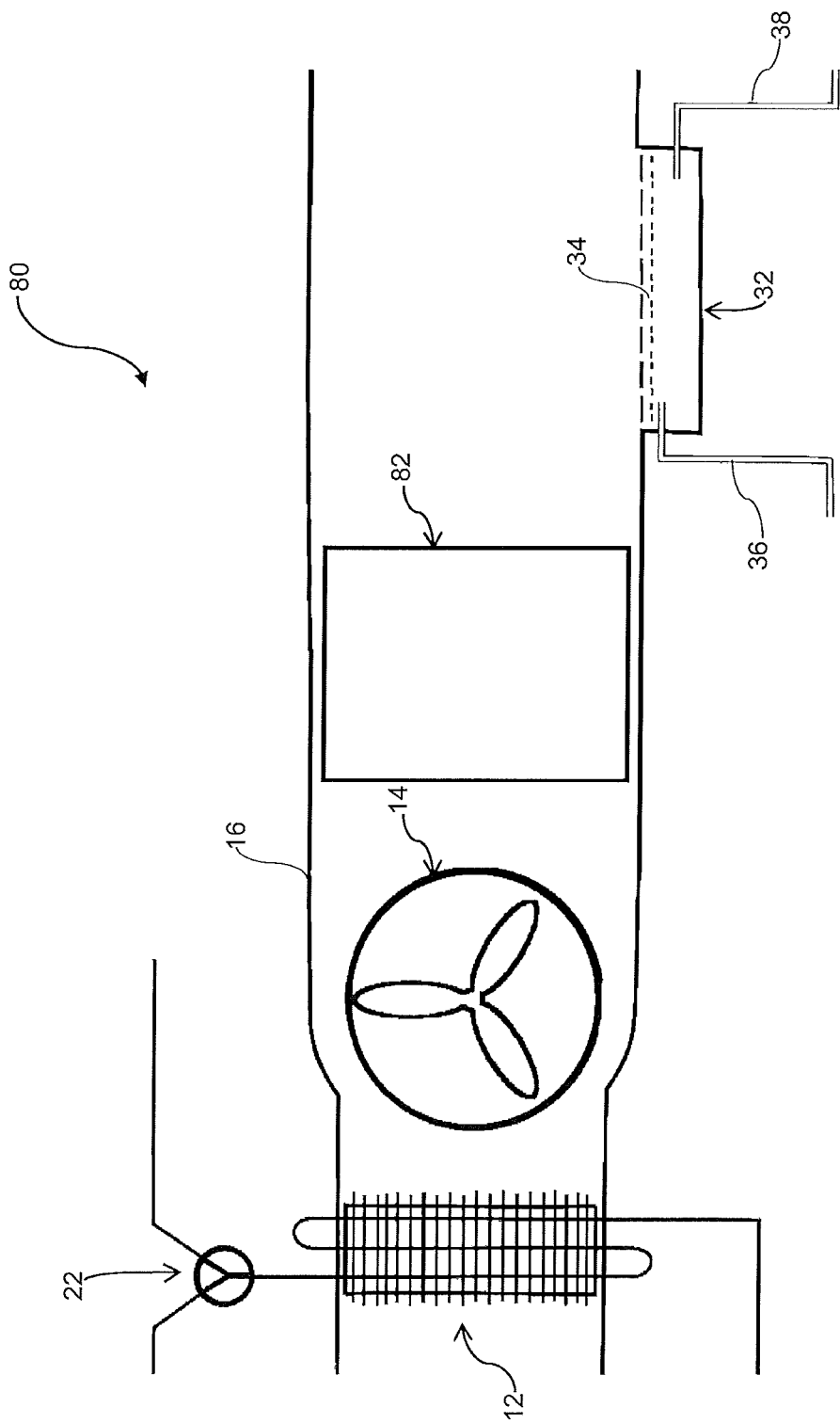
FIG. 5 is a schematic view of a dehumidification system for providing dehumidified air to a location and subsequently to an evaporative process according to a still further embodiment.

FIG. 5 illustrates an example system 80 which is similar to the system of FIG. 2 in that it is configured to allow for dehumidified air to be supplied to a process, but in addition, includes a means 82 of providing desiccated air to a location before being returned to the process. In the embodiment shown, the process is the earlier described evaporative cooling process, however, this is by example only. Components from system 30 of FIG. 2 which are the same or have a similar purpose are referenced using like numerals. The skilled addressee would appreciate that the means of providing desiccated air to the location and returning exhaust air from the location back to the process may be one or more additional fans and additional ductwork (not shown) employing appropriate air handling equipment such as dampers (not shown). The supply of desiccated air to a location and then a process may be used to further advantage where the location and the process can operate with an advantage compared to operation with ambient air.

The benefits afforded by the present invention should now be apparent. The skilled addressee would appreciate that a fluid-air heat exchanger may be coated on an external (air-side) surface with desiccant material and used to remove entrained water vapour from air by an adsorption process. Desiccant material adsorbs water at or above ambient temperatures, and the resultant air stream is of a reduced humidity compared with the humidity of the supply air. The desiccant material may then be dried/regenerated through addition of heat, driving water back into the vapour state with addition of latent energy of vaporization. Low grade heat (as low as 60° C.) may be added to the heat exchanger fluid, from solar thermal or another source, to provide energy of desorption to remove water from the desiccant material during the regeneration cycle. Tepid fluid (at or above 23° C.) may be used to remove heat of adsorption during the adsorption process. An advantage is that desiccation of air may be achieved without the need for a lower temperature condensing coil thereby eliminating the need for a reverse cycle heat pump. The low grade heat used during the regeneration cycle may be obtained from a renewable source such as a solar thermal collector, reducing or eliminating the need for fossil or nuclear fuel powered electrical energy input.

It should be apparent that the means of permitting or forcing a stream of air across one or more heat exchangers could be a fan or a series of fans. It is to be further understood that the speed of the fan may be controlled depending on the mode of operation of the heat exchanger. For example, a 2-speed fan could be used to alter air rate between adsorption and regeneration cycles. As shown in the example of FIG. 4, the system may also include a means of selecting an air path for process and waste air between cycles, and the fluid for the adsorption cycle may be supplied by an evaporative cooling means downstream of the heat exchanger(s). A further example of a means of permitting a stream of air across the desiccant coated heat exchanger(s) is air handling equipment such as a damper which when opened permits a stream of air to move through the heat exchanger.

Further advantages and improvements may very well be made to the present invention without deviating from its scope. Although the invention has been shown and described in what are conceived to be the most practical and preferred embodiments, it is recognized that departures may be made therefrom within the scope and spirit of the invention, which is not to be limited to the details disclosed herein but is to be accorded the full scope of the claims so as to embrace any and all equivalent devices, apparatus, systems and/or methods.

In any claims that follow and in the summary of the invention, except where the context requires otherwise due to express language or necessary implication, the word "comprising" is used in the sense of "including", i.e. the features specified may be associated with further features in various embodiments of the invention.

The claims defining the invention are as follows:

1. A dehumidification system for providing dehumidified air to an evaporative cooling process, the dehumidification system including:
   a fluid-air heat exchanger including an external, air-side surface coated with desiccant material, wherein during an adsorption cycle fluid is passed through the heat exchanger at a temperature which causes water vapour to be removed from a stream of air permitted or forced across the heat exchanger;
   a means for permitting or forcing the stream of air across said heat exchanger during the adsorption cycle;
   a means of heating the desiccant material during a regeneration cycle to cause adsorbed water to be removed from the desiccant material by vaporisation, thereby regenerating the desiccant material to a state which will allow the desiccant material to remove water vapour from a stream of air in a subsequent adsorption cycle;
   a means for cooling the desiccant material during the adsorption cycle in order to maintain said temperature within a range sufficient for water vapour to be removed from the stream of air, wherein the means of cooling the desiccant material is the fluid-air heat exchanger wherein cooling is achieved by passing a cooling fluid through the fluid-air heat exchanger;
   an evaporative means that includes a volume of fluid; wherein an evaporative cooling process includes permitting or forcing a volume of desiccated air across a surface area of the volume of fluid in the evaporative means, whereby the volume of air causes the temperature of said fluid to be lowered by evaporation; and wherein the volume of fluid, having had its temperature reduced by the evaporative cooling process in the evaporative means, is supplied to the fluid-air heat exchanger as cooling fluid and is used to cool the desiccant material during the adsorption cycle.

2. The dehumidification system according to claim 1, wherein the means of heating the desiccant material is the fluid-air heat exchanger, wherein heating is achieved by passing heating fluid through the fluid-air heat exchanger.

3. The dehumidification system according to claim 2, further including a 2-way valve at an entry into said heat exchanger which is operable to switch between heating and cooling fluid supply to the fluid-air heat exchanger.

4. The dehumidification system according to claim 2, wherein the heating and cooling fluid is fluid from a common sourced heated or cooled prior to entry into the fluid-air heat exchanger according to whether the fluid-air heat exchanger is operating the adsorption cycle or the regeneration cycle.

5. The dehumidification system according to claim 1, wherein the means of permitting or forcing the stream of air is one or more fans.

6. The dehumidification system according to claim 1, wherein the fluid-air heat exchanger is in the form of a fin radiator including a fluid flow pipe and associated heating cooling fins which are coated in said desiccant material.

7. The dehumidification system according to claim 1, wherein the fluid-air heat exchanger and the means for permitting or forcing the stream of air is disposed in ductwork used to transport ambient air into a location.

8. The dehumidification system according to claim 1, wherein the fluid-air heat exchanger and the means for permitting or forcing the stream of air forms part of a module which is attachable to ductwork used to transport ambient air into a location.

9. The dehumidification system according to claim 7, wherein the location is a building interior.

10. The dehumidification system according to claim 7, wherein the means of permitting or forcing the stream of air across the fluid-air heat exchanger is operated alternately in an air supply mode to permit or force the stream of air to the location via the fluid-air heat exchanger, and an air return mode to draw the stream of air out from the location.

11. The dehumidification system according to claim 10, wherein return air is supplied to the evaporative cooling process.

12. The dehumidification system according to claim 7, further including:
a second fluid-air heat exchanger operating in parallel to said fluid-air heat exchanger, wherein when the fluid-air heat exchanger is operating said adsorption cycle, the second fluid-air heat exchanger is operating said regeneration cycle, and vice versa, to ensure a continuous supply of dehumidified air to said location;
a means of switching the operation of each of the fluid-air heat exchanger and the second fluid-air heat exchanger between adsorption and regeneration cycles; and
air handing means which provide that air passing through the fluid-air heat exchanger or the second fluid-air heat exchanger operating in said regeneration cycle is not provided to the location and air passing through the fluid-air heat exchanger or the second fluid-air heat exchanger operating in said adsorption cycle is provided to the location.

13. The dehumidification system according to claim 1, wherein the volume of fluid is held in a tank and the volume of air is permitted or forced across a top surface area of a body of fluid in the tank.

14. The dehumidification system according to claim 1, wherein the volume of fluid is in the form of droplets in a cooling tower and the volume of air is permitted or forced across a surface area of each droplet.

15. The dehumidification system according to claim 1, wherein the evaporative cooling process is used to cool or re-humidify desiccated air prior to entry into a location or a further process.

16. The dehumidification system according to claim 1, further including:
a second fluid-air heat exchanger operating downstream of the process, wherein when the fluid-air heat exchanger is operating said adsorption cycle, the second fluid-air heat exchanger is operating said regeneration cycle, and vice versa;
a means of switching the operation of each of the fluid-air heat exchanger and the second fluid-air heat exchanger between adsorption and regeneration cycles;
a means of switching a mode of operation of the means of permitting or forcing a stream of air across the heat exchanger to ensure continuous supply of dehumidified air to the process such that when the fluid-air heat exchanger is operating the adsorption cycle, a stream of air is drawn across the fluid-air heat exchanger to provide dehumidified air to the process whilst the second fluid-air heat exchanger is operating the regeneration cycle, and when the second fluid-air heat exchanger is operating said adsorption cycle, a stream of air is drawn across the second fluid-air heat exchanger to provide dehumidified air to the process whilst the fluid-air heat exchanger is operating the regeneration cycle.

* * * * *